United States Patent [19]

Hawkins

[11] 3,969,965
[45] July 20, 1976

[54] MULTIPLE MOLD FORMING MACHINE
[75] Inventor: Ernest C. Hawkins, Saginaw, Mich.
[73] Assignee: Gateway Machine & Design, Inc., Saginaw, Mich.
[22] Filed: Jan. 29, 1974
[21] Appl. No.: 437,677

[52] U.S. Cl. .................................. 82/3; 82/14 R; 82/14 A; 82/24 R
[51] Int. Cl.² ........................ B23B 3/30; B23B 3/28
[58] Field of Search .............................. 82/3 14, 24

[56] References Cited
UNITED STATES PATENTS

| | | | |
|---|---|---|---|
| 2,711,113 | 6/1955 | Audemar | 82/14 A |
| 2,891,436 | 6/1959 | Corthals | 82/14 A |
| 3,264,910 | 8/1966 | Kindelman | 82/3 |
| 3,436,994 | 4/1969 | Diener, et al. | 82/24 |
| 3,694,875 | 10/1972 | Zimmermann | 82/14 A |
| 3,726,162 | 4/1973 | Sato | 82/3 |

Primary Examiner—Leonidas Vlachos
Attorney, Agent, or Firm—Stanley J. Price, Jr.; John M. Adams

[57] ABSTRACT

A multiple mold forming machine includes a L-shaped vertical bed having a headstock positioned at one end in which are provided a plurality of rotatable spindles. The spindles rotatably support a plurality of mold blanks and a single master mold. At the opposite end of the bed positioned for longitudinal movement on a beam member secured to the bed is a carriage. The carriage is slidably mounted to the bed and is advanced toward and away from the spindles by operation of a ball screw assembly secured to the bottom of the carriage. A plurality of tool assemblies together with a tracing assembly are rigidly mounted on a cross slide which is arranged to move transversely relative to the longitudinal axis of the bed. Each tool assembly includes a cutting element having a longitudinal axis aligned in co-planar relationship with the axis of rotation of a corresponding mold blank positioned on a spindle in the headstock. Advancement of the carriage on the bed toward the spindles moves the cutting elements together with the tracing assembly into opposed relation with the mold blanks and the master mold. Rotation of a handwheel on the cross slide moves the cutting elements together with the tracer assembly into abutting contact with the respective mold blanks and the master mold. A fluid actuated piston cylinder assembly maintains the stylus head of the tracer assembly in abutting contact with the surface of the master mold. Thus, the cutting elements follow the path of the stylus head on the master mold to simultaneously cut from the mold blanks a plurality of molds having a configuration identical to that of the master mold.

9 Claims, 4 Drawing Figures

MULTIPLE MOLD FORMING MACHINE

BACKGROUND OF THE INVENTION

1. Field of the Invention

This invention relates to a multiple mold forming machine and more particularly to a mold forming machine in which a plurality of molds may be simultaneously cut from a master mold wherein the mold blanks and cutting elements are accessable for positioning and removing from the machine.

2. Description of the Prior Art

Conventional mold duplicating machines for both rotary and flat contouring operations are essentially modified lathes which are adapted to include a master mold positioned within a chuck rotatably mounted in a headstock with one or two blank molds positioned adjacent thereto. A tailstock, having a cutting tool for each mold blank and a tracing element, is positioned remote of the master mold and mold blank and is arranged for horizontal travel on a bed. Horizontal movement of the tailstock on the bed brings the tracing element and cutting tools into abutting contact with the surface of the master mold and the blank members respectively. The stylus of the tracing element follows the contour of the master mold. Variations in the contour of the master, as followed by the stylus, are translated into corresponding movement of the cutting elements. Thus, the cutting elements form from the mold blanks a duplication of the master mold. In this manner, circular molds and flat templates can be reproduced in the manufacture of glass bottle molds, plastic molds, engine parts and other similar products.

The principal problem encountered with the above described conventional mold duplicating machine is its limited production capacity. The problem is not solved, however, by merely increasing the number of cutting elements and the corresponding number of mold blanks. Expanding the size of the machine only creates additional difficulties such as restricting the operator's access to the mold blank spindles. Furthermore, increasing the number of cutting elements presents problems in adequately supporting the cutting elements in the tailstock and making adjustments to the elements.

An increase in the dimension of the headstock and tailstock of a conventional lathe-type duplicating machine to accommodate additional mold blanks and cutting elements has shown to substantially reduce the overall rigidity of the duplicator. Unless the mold blanks and cutting elements are rigidly supported, the reproduction quality of the molds will not be acceptable. Moreover, extreme difficulty is encountered in maintaining 2 co-planar relationship between the axis of rotation of a mold blank and the corresponding longitudinal axis of the cutting element when the mold blanks and cutting elements are not adequately supported on the horizontal bed. This disadvantage also reduces the responsiveness of the cutting elements to a change in the contour of the master mold as detected by the tracing element.

U. S. Pat. No. 2,858,743 illustrates a milling machine of the type used in the production of pressed glass molds. A pair of rigidly linked cross carriages and transverse carriages, each having vertical carriages supporting milling heads, are positioned vertically above a pair of workpieces to be cut in a configuration identical to or a mirror image of a selected pattern. One of the milling heads is connected by an arm to the tracer mechanism. The cross carriages of both milling heads are locked so that the tracing mechanism will control the cutting path of the milling heads. However, the complexity of the carriage linkage reduces the number workpieces and milling heads available thereby limiting the output of the milling machine.

A rotary cutter bar for machining the interior surface of a hollow workpiece is disclosed in U. S. Pat. No. 3,289,537. A carrier mechanism supports a follower with a tracer pin and a cutter bar in fixed spaced relation. The tracer follows the interior contour of a master mold which is rotated at a preselected speed by a drive motor. The cutter bar is provided with a cutter bit which responses to changes in the contour of the master mold as followed by the tracker pin to the interior surface of the die mold. The die mold is rotated by the drive motor to reproduce the design in the die mold. The output of the rotary cutter bar is limited to the reproduction of only a single die mold. Furthermore, the carrier is supported in such a manner to provide for only incremental movement toward and away from the die mold and master mold.

A duplicating machine having a tracing unit and at least two milling units is illustrated and described in U.S. Pat. No. 3,298,642. Workpieces are supported by a sled with the pattern supported by another sled both positioned for longitudinal movement on a bed. The bed supports a vertical stand which carries a cross head. The cross head secures a vertical head over the workpieces. Two milling units and a tracer unit are rotatably mounted in the vertical head. The tracer unit follows the contour of the pattern and the milling units move in the same direction for making the workpieces identical to the pattern. However, the number of milling units that can be satisfactorily supported by the vertical head and the limited access to the milling units for changing cutting elements substantially reduce the versatility of the machine.

There is need to provide a mold forming machine that is capable of performing both rotary and flat contour profiling operations to produce from a master mold a plurality of molds having a configuration identical to that of the master mold. Furthermore, the cutting tools and the mold blanks must be readily accessable for positioning and replacement in the machine and be securely supported in order to attain acceptable reproduction quality.

SUMMARY OF THE INVENTION

This invention relates to a multiple mold forming machine which includes an elongated bed and a headstock fixedly mounted on the bed for supporting a plurality of workpieces. A carriage is also mounted on the bed for longitudinal movement toward and away from the headstock. An advancing mechanism is provided for moving the carriage toward and away from the headstock on the bed. The carriage is positioned remote of the headstock so that an access opening is provided between the carriage and the headstock. A cross slide is mounted on the carriage for transverse movement relative thereto, and a means is provided for traversing the cross slide on the carriage. The plurality of cutting elements and a tracing element are rigidly supported on the cross slide and are arranged for transverse movement relative to the carriage.

The carriage, being arranged for longitudinal movement on the bed, maintains the cutting elements and the tracing element in a horizontal plane with the axis of rotation of the respective workpieces and a master workpiece, both rotatably supported on spindles in the headstock. A means is provided on the carriage for maintaining the tracing element in abutting contact with the master workpiece to allow each of the cutting elements to follow a cutting path on each of the workpieces. The cutting elements instantaneously respond to a variation in the contour of the master workpiece as followed by the tracing element on the master. With this arrangement, the cutting element simultaneously form a plurality of items having a configuration identical to that of the master workpiece.

Accordingly, the principal object of this invention is to provide a mold forming machine capable of simultaneously and precisely producing a plurality of workpieces having a configuration identical to that of a master workpiece.

A further object of this invention is to provide a multiple mold forming machine which includes a plurality of workpiece supporting units and a master workpiece receiving unit rigidly supported on a vertical L-shaped bed with a sufficiently large access opening to permit efficient positioning and adjusting of the workpieces and the master workpiece in the headstock.

Another object of this invention is to provide a multiple mold forming machine having a plurality of the cutting elements and a tracing element rigidly supported by a single carriage which is mounted for slidable horizontal movement on a vertical L-shaped bed.

Still another object of this invention is to provide a multiple mold forming machine which is sufficiently stable to perform both rotary and flat contour profiling operations for precisely and simultaneously producing a plurality of workpieces having a configuration identical to that of the master workpiece.

These and other objects and advantages of this invention will be more completely described and disclosed in the following specification, the accompanying drawings and the appended claims.

DESCRIPTION OF THE PREFERRED EMBODIMENTS

Figure 1:
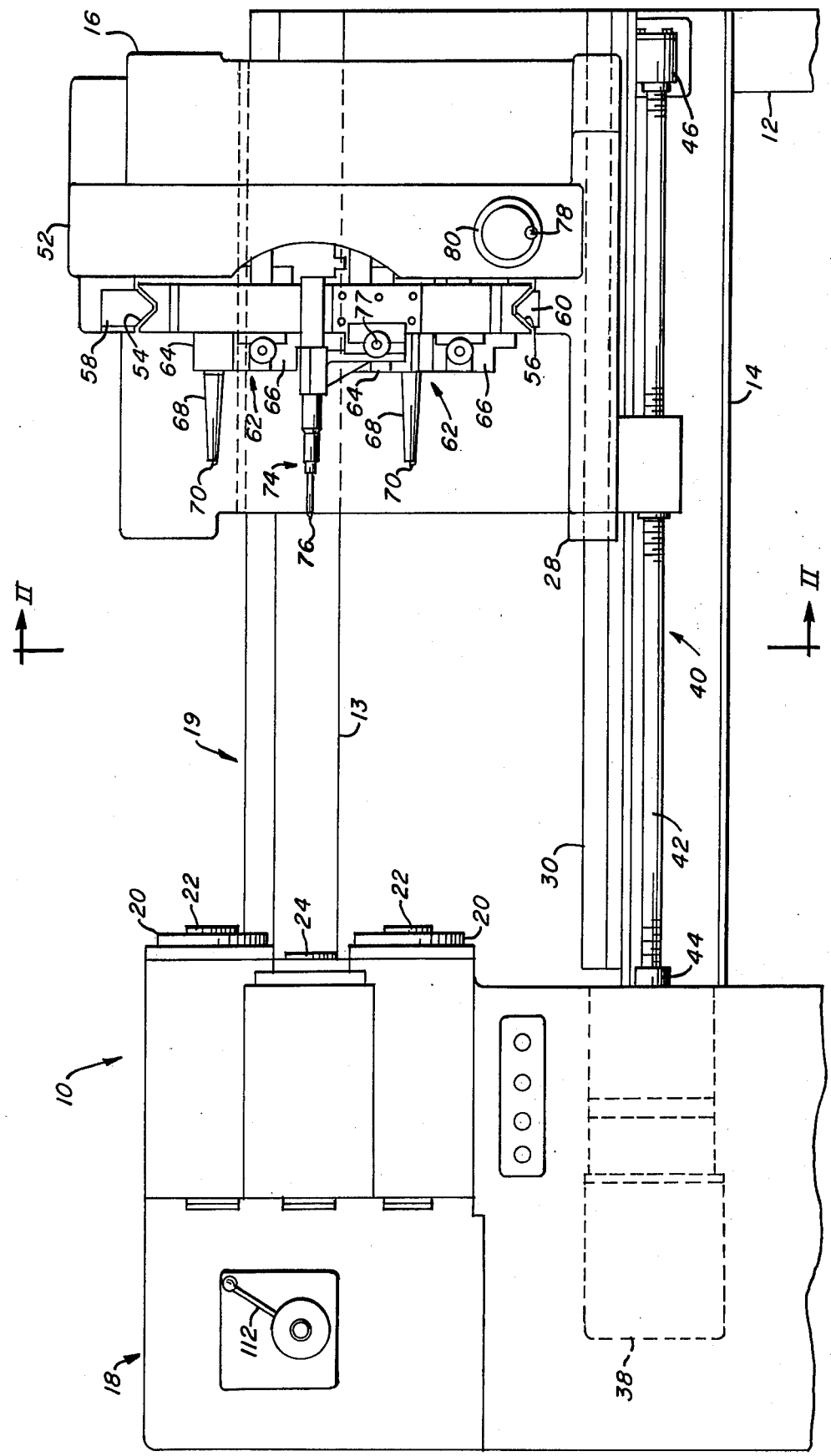
FIG. 1 is a view in side elevation of the multiple mold forming machine, illustrating a plurality of cutting elements supported on a carriage arranged to engage a plurality of mold blanks for simultaneously forming molds having a predetermined configuration and for advancing and retracting the carriage.
Figure 2:
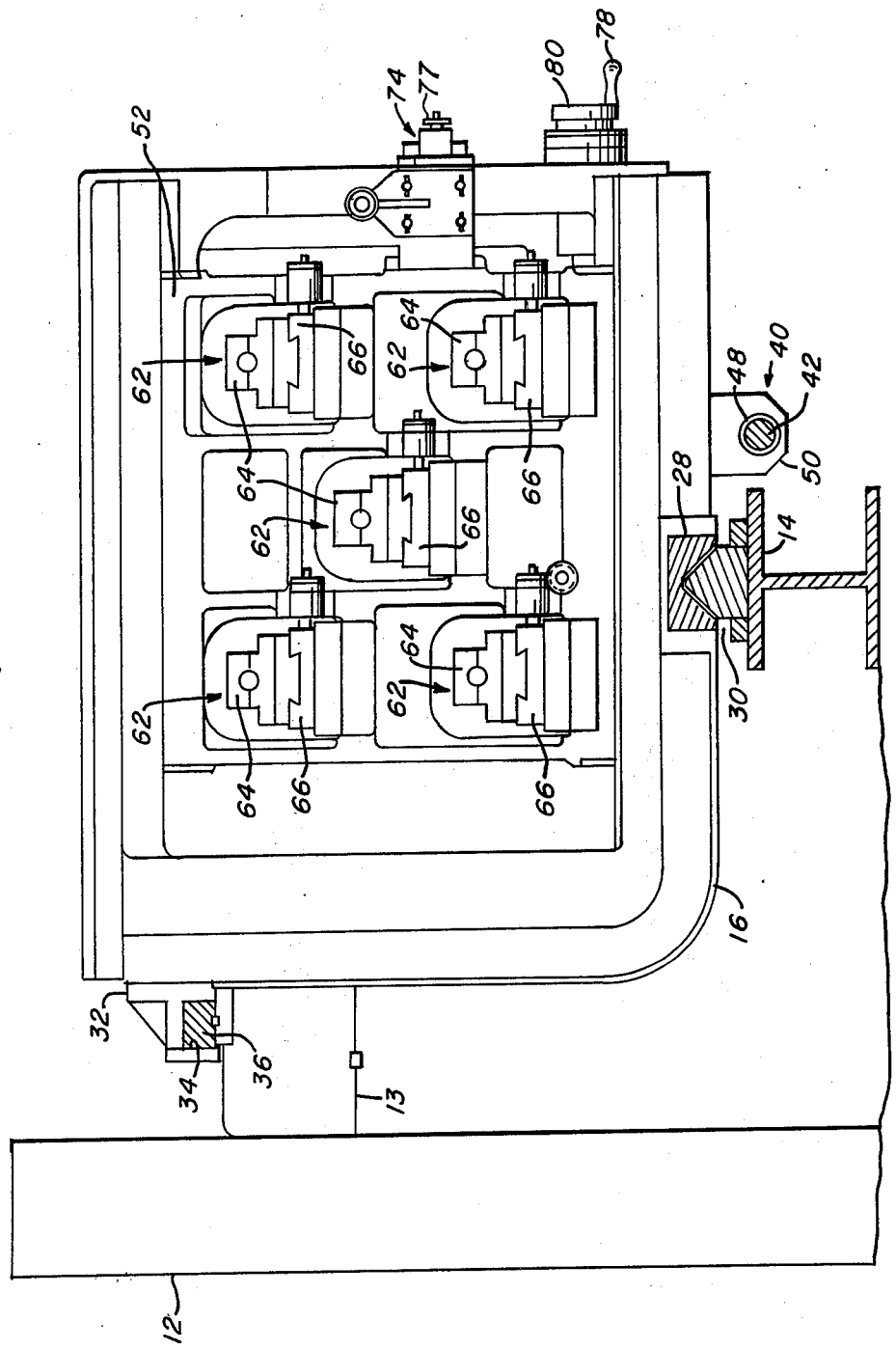
FIG. 2 is a rear view taken along the line II—II of FIG. 1, illustrating the manner in which the carriage is supported for longitudinal movement on the bed of the multiple mold forming machine.

Referring to the drawings and particularly FIGS. 1 and 2, there is illustrated a multiple mold forming machine generally designated by the numeral 10 that includes a vertical L-shaped bed 12 having an I-beam 14 secured to the lower portion of the bed 12. A horizontal beam 13 aligned parallel with and positioned laterally above the I-beam 14 is secured to the upper portion of the bed 12. A carriage 16 is rigidly mounted on the beams 13 and 14 for longitudinal movement, in a manner to be explained hereinbelow, toward and away from a headstock 18 positioned remote of the carriage 16 at the end of the bed 12. This arrangement provides an opening generally indicated by the numeral 19 which affords the machine operator with unobstructed access to the headstock 18 and the carriage 16.

The headstock 18 is provided with a plurality of spindles 20 arranged vertically above the I-beam 14 and having an axis of rotation parallel to the direction of travel of the carriage 16 on the bed 12. The spindles 20 are rotatably driven at a preselected speed by suitable power means provided in the headstock 18, such as a variable speed electric or hydraulic motor. Each spindle 20 rotatably supports a chuck 22 that is arranged to engage for rotation a workpiece (not shown), such as a mold blank from which a mold having a preselected configuration is to be cut. Thus, rotation of the spindle 20 is transmitted to the workpiece through the chuck 22. Also provided on the headstock 18 is a master chuck 24 arranged to rotatably support a master (not shown), such as a master mold.

The master mold serves as a pattern for simultaneously reproducing from the workpieces a product having a configuration identical to that of the master. For example, a plurality of molds may be formed from a master mold having an internal configuration such as the external configuration of a glass bottle to be used in making glass bottles. Thus, the rigid construction of the chucks 22 and the master chuck 24 on the spindles 20 in the headstock 18 provides for precise reproduction of the master mold. In addition, the arrangement of the workpieces and the master mold positioned in the headstock 18 vertically above the bed 12 and remote of the carriage 16 provides unobstructed access for the placement and removal of the workpieces in the chucks 22 and the master mold in the master chuck 24.

As illustrated in FIGS. 1 and 2, an elongated lower guide member 28 is provided at the bottom intermediate portion of the carriage 16 and is positioned in spaced, overlying parallel relationship with the I-beam 14. The lower guide member 28 is arranged to engage the surface of a longitudinal lower guide rail 30. The lower guide rail 30 is rigidly mounted to the top surface of the I-beam 14 and extends substantially the entire length of the bed 12. The lower guide rail 30 has a V-shaped configuration which corresponds with the configuration of the lower guide member 28. The coacting surfaces of the lower guide rail 30 and the lower guide member 28 are finely ground to reduce the friction and provide slidable horizontal movement of the lower guide member 28 on the lower guide rail 30.

At the upper portion of the bed 12, a bracket 32 is secured to and projects outwardly from the carriage 16 above the beam 13. The bracket 32 includes an upper guide member 34, having a generally rectangular configuration, arranged to receive a longitudinal upper guide rail 36. The upper guide rail 36 is rigidly mounted on the beam 13 and positioned parallel to and spaced laterally above the I-beam 14. Thus, the upper guide member 34 is arranged for horizontal slidable movement longitudinally on the upper guide rail 36 in a direction of travel parallel to the longitudinal movement of the lower guide member 28 on the lower guide rail 30. With this arrangement, the carriage 16 is securely positioned for horizontal movement toward and away from the headstock 18 on the guide rails 30 and 36 and is restrained from lateral or vertical movement thereon. Furthermore, this feature permits movement of the carriage 16 to a desired position on the bed 12 to facilitate unobstructed access to the headstock 18 and the carriage 16.

Figure 4:
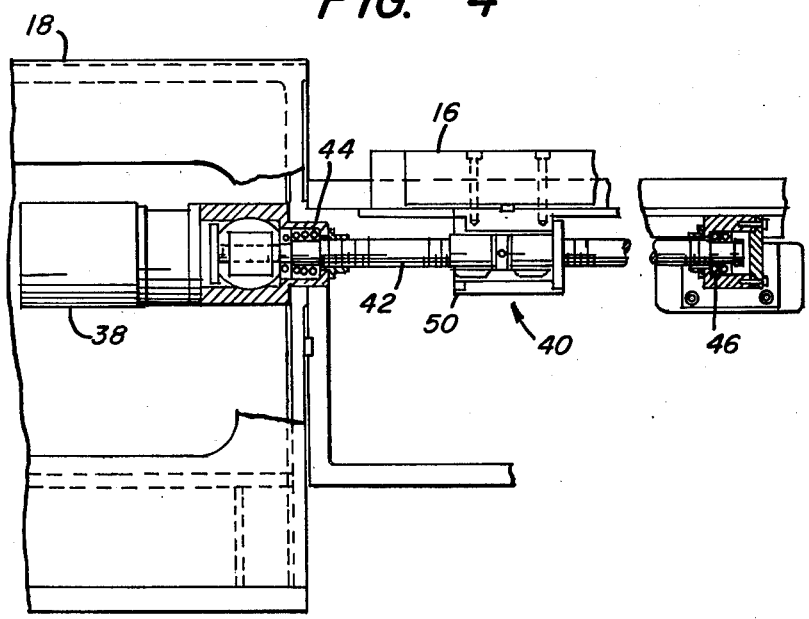
FIG. 4 is an elevation partly in section, illustrating the ball screw drive of the carriage drive assembly.

The carriage 16 is propelled on the guide rails 30 and 36 by a hydraulic servomotor 38 which is positioned in the headstock 18 and drivingly connected to a ball screw assembly generally designated by the numeral 40 illustrated in FIGS. 1 and 4. The ball screw assembly 40 includes a ball screw 42 supported in the headstock 18 by bearing assembly 44 and journaled at its opposite end within the bearing assembly 46 which is bolted to the I-beam 14. In this manner, the ball screw 42 is rotatably supported below and parallel to the guide rail 30. A ball nut 48 surrounds the ball screw 42 and is contained within a housing 50 which is, in turn, threadedly connected to the ball screw 42. The housing 50 is bolted to the bottom surface of the carriage 16 adjacent the forward end portion thereof. Thus, rotation of the ball screw 42 in a selected direction will advance the carriage 16 on the guide rails 30 and 36 toward and away from the headstock 18.

Figure 3:
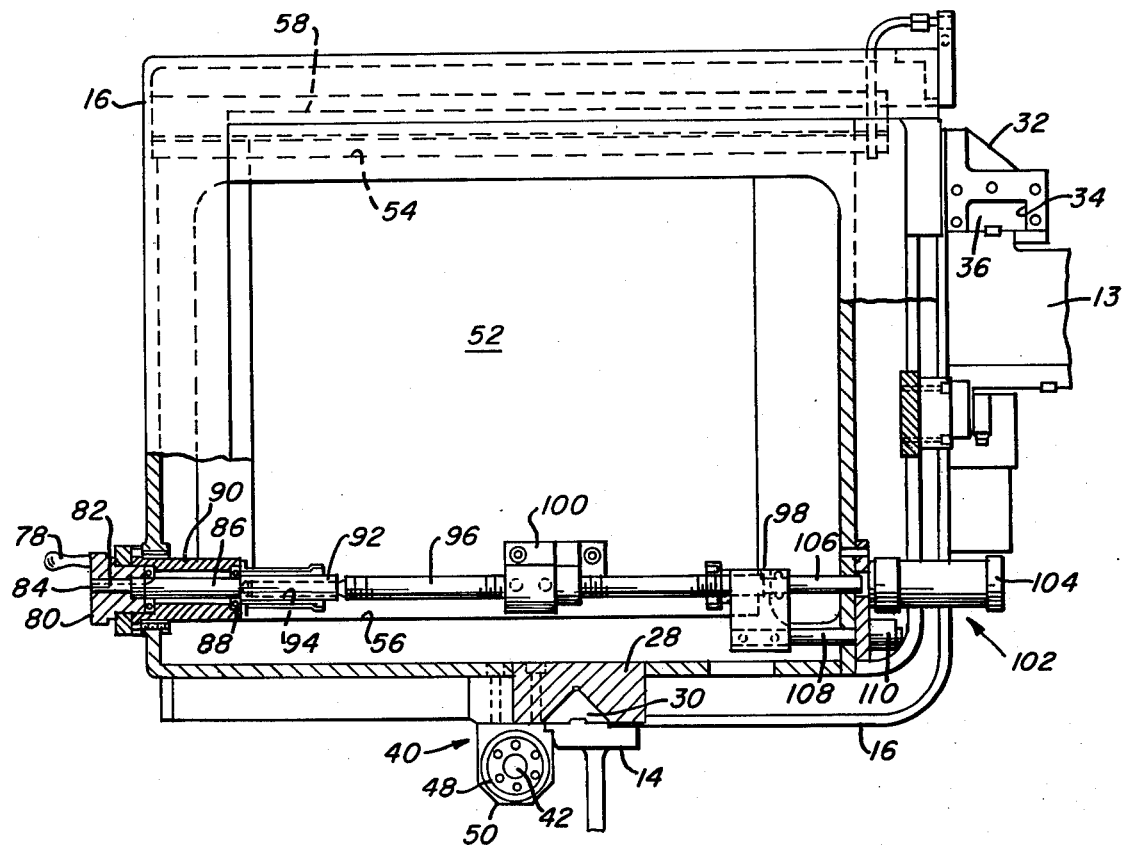
FIG. 3 is an elevation partly in section, illustrating the drive assembly for moving the cross slide on the carriage.

As illustrated in FIGS. 1, 2 and 3, the carriage 16 includes a vertical cross slide 52 having upper and lower V-shaped guide members 54 and 56 arranged for slidable transverse movement on the surface of upper and lower V-shaped guide bars 58 and 60. The guide bars 58 and 60 are rigidly retained in parallel relationship transversely on the carriage 16. With this arrangement, the cross slide 52 is securely positioned on the carriage 16 for slidable movement transversely of the carriage 16 and is restrained from longitudinal and vertical movement thereon. Thus, as described above, the carriage 16 and the cross slide 52 are precisely controlled for longitudinal and transverse movement respectively on the bed 12.

A plurality of tool assemblies generally designated by the numeral 62 are selectively positioned in the cross slide 52. Each tool assembly 62 includes a tool block 64 adjustably supported by a saddle portion 66. A suitable cutting tool 68, as shown in FIG. 1, having a cutting edge 70 is positioned in each of the tool blocks 64 so that the longitudinal axis of the cutting tool 68 and the axis of rotation of a corresponding workpiece rotatably mounted on the spindle 20 are aligned in a horizontal plane. Then longitudinal and transverse movement of the carriage 16 and cross slide 52, in a manner described hereinbelow, positions the edge 70 of the cutting tool 68 in abutting contact with the surface of the workpiece. For purposes of illustration only, five tool assemblies 62 are shown for cutting five workpieces in conformity to a master pattern; however, any number of workpieces may be simultaneously cut with this arrangement.

Referring to FIGS. 1 and 2, there is illustrated a tracer assembly generally designated by the numeral 74 which is securely positioned on the cross slide 52. The tracer assembly 74 includes a detachable stylus head 76 having a longitudinal axis that is aligned in a horizontal plane with the axis of rotation of the master chuck 24 so that the tip of the stylus head 76 may engage the master mold retained in the master chuck 24. The tracer assembly 74 is also provided with an adjusting dial 77 by which the machine operator may adjustably control the degree of deflection of the stylus head 76.

The tracer assembly 74 may be conveniently positioned at any desired location on the cross slide 52, preferably at a location where it will be convenient for the operator to change the stylus head 76 as required by the cutting operation to be performed. Thus, the above described arrangement of the compound tool assemblies 62 and the tracer assembly 74 on the cross slide 52 of the carriage 16 provides for efficient exchange of the cutting tools 68 and the stylus head 76. In addition, the rigid support of the cutting tools 68 and the stylus 76 on the cross slide 52 permits accurate cutting of the workpieces to precisely reproduce the configuration of the master mold.

Transverse movement of the cross slide 52 on the carriage 16 may be manually controlled by rotating the cross slide handwheel 78, illustrated in FIG. 3. The handwheel 78 is connected to a collar portion 80 that has a central bore 82 extending therethrough. A stub shaft 84 is positioned within the bore 82 and is splined to the collar portion 80. The stub shaft 84 is, in turn, coaxially connected to a shaft 86 which is rotatably supported by bearings 88 in a tubular member 90 secured to the carriage 16. The shaft 86 is coaxially connected to a sleeve member 92 having an internally splined chamber 94. An elongated threaded screw rod 96 positioned parallel to the carriage 16 extends transversely across the bed 12 and has one end portion splined to the sleeve 92 within the chamber 94. The other end portion of the screw rod 96 is rotatably journaled in a bearing support 98. Threadedly engaged to the intermediate portion of the screw rod 96 is a positioning nut assembly 100 that is bolted to the rear portion of the cross slide 52.

In operation, the rotation of the handwheel 82 is transmitted through the shaft 86 to the sleeve member 92. Rotation of the sleeve member 92 provides for rotation of the screw rod 96 and transverse displacement of the positioning nut assembly 100. Displacement of the positioning nut is, in turn, transmitted to the cross slide 52 to thereby move the cross slide 52 transversely on the upper and lower guide members 58 and 60 of the carriage 16. In this fashion, clockwise or counterclockwise rotation of the handwheel 78 provides for movement of the cross slide 52 transversely on the carriage 16.

When the stylus head 76 is brought into abutting contact with the surface of the master mold, contact is maintained by transverse movement of the cross slide 52 on the carriage 16 by operation of the fluid actuated piston cylinder assembly generally designated by the numeral 102 in FIG. 3. The piston cylinder assembly 102 includes a cylinder 104 rigidly mounted to the carriage 16 and axially aligned with the screw rod 96. An extensible piston rod 106 projects outwardly from the cylinder 104 and is secured at its outer end portion to the bearing support 98. A support shaft 108 is provided in spaced parallel relation below the piston rod 106 and has one end portion secured within the bearing support 98 and the other end portion axially mounted for slidable movement within the bearing 110 on the carriage 16.

Fluid from a reservoir is supplied to the piston cylinder assembly 102 by a conduit (not shown) to extend the piston rod 106 outwardly from the piston 104. Extension of the piston rod 106 is transmitted through the bearing support 98 to move the cross slide 52 transversely on the carriage 16 away from the beam 13 of the bed 12. Accordingly, retraction of the rod 106 within the cylinder 104 moves the cross slide 52 transversely on the carriage toward the beam 13. The support shaft 108 connected to the bearing support 98 serves to maintain axial alignment of the piston rod 106 within the cylinder 104 as it extends and retracts to thereby assure transverse displacement of the cross slide 52 on the carriage 16.

Rotation of the ball screw 43 advances the carriage 16 together with the cross slide 52 longitudinally on the upper and lower guide rails 34 and 30 to thereby move the stylus head 76 of the tracer assembly 74 adjacent to the master mold on the headstock 18. Rotation of the handwheel 78 urges the stylus head 76 into abutting contact with the surface of the master mold. The spindle drive is engaged by operation of the transmission lever 112 to provide for rotation of the chucks 22 and the workpieces positioned therein. With the lever 112 engaged, starting and stopping and changes in the spindle speed are subsequently controlled by operation of a speed control dial and spindle start, stop buttons provided at an operator's station positioned adjacent the machine 10.

Actuation of the piston cylinder assembly 102 maintains abutting contact of the stylus head 76 with the master mold during the controlled advance or retraction of the carriage 16. The cutting edges 70 follow a cutting path on the workpieces identical to that followed by the stylus head 76 on the surface of the master. Any changes in the contour of the master are detected by the stylus head 76 and are translated to the cutting elements 68 which instantaneously respond to alter the cutting path. In this fashion, a plurality of workpieces are simultaneously cut having a configuration identical to that of the master.

The practice of the present invention is not restricted to rotary profile operations as described hereinabove but is equally adaptable to round or template contouring as well. To convert the cutting operation from rotary profile to flat or round template contouring, it is necessary to interchange the stylus head 76 for the appropriate stylus head desired for the particular contouring operation. In a similar manner as detailed above, the carriage 16 is advanced toward the headstock 18 so that the stylus head 76 and the cutting tools 68 are positioned laterally of the master workpiece or template and the blank workpieces respectively. The transverse cutting operation begins by actuating the piston cylinder assembly 102 to urge the stylus head 76 into abutting contact with the surface of the master workpiece. Rotation of the spindles is initiated, and the spindle speed is then adjusted to the desired speed. Accordingly, the cutting tools 68 will follow the transverse movement of the stylus head 76 on the surface of the master workpiece, instantaneously responding to changes therein, to simultaneously reproduce on the blank workpieces the surface configuration of the master workpiece or flat template.

Deflections or over travel from the surface of the master workpiece or flat template are accomplished by manual operation of the cross slide 52 on the carriage 16 through the stylus head adjusting dial 77. In addition, rotation of the handwheel 78 in a selected direction will engage or disengage the cutting tools 68 from cutting relationship with the workpieces to simultaneously form a plurality of products having a configuration identical to that of the master workpiece or template.

If it is desired at any time to terminate the cutting operation without disengaging the abutting contact between the stylus head 76 and the master mold 26, the spindle speed is reduced to zero by turning the spindle speed dial provided at the operator's station. The stylus head 76 will remain in contact with the surface of the master workpiece. The cutting operation may then be resumed when the spindle drive is again engaged. The cutting operation will commence at the point where it was terminated without the necessity of repositioning the stylus head 76 on the master workpiece.

It will be apparent from the above description of the present invention that the slidable arrangement of the carriage 16 on the L-shaped bed 12 and of the cross slide 52 on the carriage 16 provide a rigid structure for supporting the tool assemblies 62 and the tracer assembly 74. The tool assemblies 62 and the tracer assembly 74 are accurately controlled with this arrangement to provide precise reproduction of the master workpiece. By operation of either the piston assembly 102 or the manual handwheel 78, the cross slide 52 may be moved transversely to a preselected position on the carriage 16 without altering the co-planar relationships of the cutting tools 68 and the stylus head 76 with the respective workpieces and the master workpiece. Also, the arrangement of the headstock 18 on the bed 12 relative to the carriage 16 provides a sufficiently large access opening 19 to enable the operator to easily position and remove workpieces and cutting tools 68, as well as the master workpiece and stylus head 76.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:
1. A multiple mold forming machine comprising,
   an elongated bed,
   a longitudinal lower guide rail rigidly mounted on said bed,
   a longitudinal upper guide rail rigidly mounted on said bed and laterally positioned above and in parallel relationship with said lower guide rail,
   a headstock fixedly mounted on said bed for supporting a plurality of workpieces,
   a carriage having a bottom portion and a side portion, said carriage bottom portion slidably mounted on said lower guide rail and said side portion slidably mounted on said upper guide rail for longitudinal movement of said carriage relative to said bed toward and away from said headstock,
   means for longitudinally moving said carriage toward and away from said headstock on said bed,
   said upper and lower guide rails and said carriage positioned thereon arranged to provide an access opening between said carriage and said headstock to permit unobstructed access to said carriage and said headstock,
   said carriage having upper and lower V-guide bars spaced in parallel relationship to each other,
   a cross slide, having upper and lower V-guide members spaced in parallel relation to each other, said carriage upper and lower V-guide bars slidably mounted in said cross slide upper and lower V-guide members to permit transverse movement of said cross slide on said carriage,
   means for traversing said cross slide on said carriage, and
   a plurality of cutting elements rigidly supported by said cross slide.

2. A multiple mold forming machine as set forth in claim 1 which includes,
an upper guide member secured to and extending outwardly from said carriage, said upper guide member positioned for slidable longitudinal movement on said upper guide rail, and
a lower guide member rigidly retained intermediately in the bottom portion of said carriage, said lower guide member positioned for slidable longitudinal movement on said lower guide rail.

3. A multiple mold forming machine as set forth in claim 2 which includes,
said lower guide rail having a V-shaped configuration, and
said lower guide member having V-shaped recess arranged to slidably receive said V-shaped lower guide rail.

4. A multiple mold forming machine as set forth in claim 2 which includes,
said upper guide rail having a pair of horizontal and vertical surfaces,
said upper guide member including a channel having a horizontal surface and a pair of vertical surfaces arranged to slidably engage one of said upper guide rail horizontal surfaces and said upper guide rail vertical surfaces respectively.

5. A multiple mold forming machine as set forth in claim 1 in which said means for longitudinally moving said carriage includes,
an elongated ball screw positioned parallel to said bed having one end portion rotatably journaled to said bed and a second end portion rotatably journaled to said headstock,
means connected to said ball screw second end portion for rotating said ball screw at a preselected speed, and
a ball nut threadly engaged to said ball screw and secured to said carriage, said ball nut arranged to move longitudinally on said ball screw upon rotation thereof such that said carriage moves toward and away from said headstock.

6. A multiple mold forming machine as set forth in claim 1 in which said traversing means includes,
an elongated threaded rod positioned parallel to said carriage and having one end portion rotatably journaled to said cross slide and a second end portion,
a handwheel rotatably mounted to said carriage, shaft means connecting said handwheel to said rod second end portion for transmitting rotation from said handwheel to said rod, and
positioning means threadedly engaged to said rod and secured to said cross slide for moving said cross slide transversely on said carriage upon rotation of said handwheel.

7. A multiple mold forming machine as set forth in claim 1 which includes,
a tracing element rigidly supported by said cross slide,
means integrally connected to said headstock adapted to receive a master mold,
means for maintaining said tracing element in abutting contact with the master mold retained in said master mold receiving means to permit each of said cutting elements to follow a cutting path on each of the workpieces which corresponds to the path followed by said tracing element on the master mold such that a plurality of molds are formed having a configuration identical to that of the master mold, and
means for adjusting the deflection of said tracing element from the surface of the master mold.

8. A multiple mold forming machine as set forth in claim 7 in which said means for maintaining said tracing element in contact with said master mold receiving means includes,
a fluid actuated cylinder supported by said carriage,
a rod member extending outwardly from said cylinder and arranged for axial movement therein transversely relative to said carriage,
support means fixedly secured to said cross slide and arranged to receive said rod member for transmitting movement of said rod member to said cross slide, and
means for maintaining axial alignment of said rod member in said cylinder.

9. A multiple mold forming machine as set forth in claim 1 which includes,
a plurality of spindles each adapted to rotatably support a workpiece in said headstock, and
said cross slide securely mounted for slidable movement on said carriage transversely to said lower and upper guide rails such that the longitudinal axis of each of said cutting elements is maintained in a horizontal plane with the corresponding axis of rotation of each of said spindles as said cross slide moves with said carriage on said lower and upper guide rails toward and away from said headstock.

* * * * *